United States Patent
Kim et al.

(10) Patent No.: US 9,959,803 B2
(45) Date of Patent: May 1, 2018

(54) ELECTRONIC DEVICE AND METHOD OF CONTENT DISPLAY

(71) Applicant: Samsung Electronics Co., Ltd., Gyeonggi-do (KR)

(72) Inventors: Junghyung Kim, Gyeonggi-do (KR); Boram Namgoong, Seoul (KR); Yoywang Im, Gyeonggi-do (KR); Jiyoung Kim, Gyeonggi-do (KR); Buseop Jung, Gyeonggi-do (KR)

(73) Assignee: Samsung Electronics Co., Ltd., Yeongtong-gu, Suwon-si, Gyeonggi-do, (KR)

( * ) Notice: Subject to any disclaimer, the term of this patent is extended or adjusted under 35 U.S.C. 154(b) by 0 days. days.

(21) Appl. No.: 14/721,302

(22) Filed: May 26, 2015

(65) Prior Publication Data
US 2015/0348459 A1    Dec. 3, 2015

(30) Foreign Application Priority Data

May 29, 2014 (KR) .......................... 10-2014-0065393

(51) Int. Cl.
*G09G 5/02* (2006.01)
*G09G 3/20* (2006.01)
(Continued)

(52) U.S. Cl.
CPC ............ *G09G 3/2085* (2013.01); *A45C 11/00* (2013.01); *G06F 1/1677* (2013.01); *G06F 3/0416* (2013.01); *G06F 3/04886* (2013.01); *H04M 1/185* (2013.01); *A45C 2011/002* (2013.01); *A45C 2200/10* (2013.01);
(Continued)

(58) Field of Classification Search
CPC .......... G09G 3/2085; G09G 2310/0213; A45C 11/00; A45C 2011/002; A45C 2200/10; G06F 1/1677; G06F 3/0416; G06F 3/04886; G06F 2200/1634; G06F 2203/04107; H04M 1/185; H04M 1/72575; H04M 2250/12
See application file for complete search history.

(56) References Cited

U.S. PATENT DOCUMENTS 5,710,576 A * 1/1998 Nishiyama ........... G08B 3/1058
345/169
8,032,193 B2 * 10/2011 Xin ..................... H04M 1/0247
379/330
(Continued)

FOREIGN PATENT DOCUMENTS

EP          2 296 355 A2    3/2011
KR    10-2013-0078268 A    7/2013
(Continued)

*Primary Examiner* — Peter D McLoone
(74) *Attorney, Agent, or Firm* — Cha & Reiter, LLC

(57) ABSTRACT

A device and methods for content display are disclosed. In various embodiments, a method for content display comprises detecting at least one of an open area or a transparent area in a display cover coupled to an electronic device, setting a partial display-area on a display area of the electronic device in response to the detecting, where the partial display-area corresponds to the at least one of the open area or the transparent area, setting content to the partial display-area, displaying the content in the partial display-area.

21 Claims, 8 Drawing Sheets

(51) Int. Cl.
    *G06F 3/041*     (2006.01)
    *G06F 1/16*     (2006.01)
    *G06F 3/0488*     (2013.01)
    *H04M 1/18*     (2006.01)
    *H04M 1/725*     (2006.01)
    *A45C 11/00*     (2006.01)

(52) U.S. Cl.
    CPC ............... *G06F 2200/1634* (2013.01); *G06F 2203/04107* (2013.01); *G09G 2310/0213* (2013.01); *H04M 1/72575* (2013.01); *H04M 2250/12* (2013.01)

(56) References Cited

U.S. PATENT DOCUMENTS

| | | | | |
|---|---|---|---|---|
| 8,761,660 B2* | 6/2014 | Libin | ................ | G09B 3/00 434/362 |
| 8,922,506 B2* | 12/2014 | Jung | ................ | G06F 1/1626 205/777 |
| 9,189,020 B2* | 11/2015 | Nguyen | ................ | G06F 1/1626 |
| 9,207,804 B2* | 12/2015 | Cudak | ................ | G06F 3/0418 |
| 9,285,839 B1* | 3/2016 | Cudak | ................ | G06F 1/1677 |
| 9,294,596 B2* | 3/2016 | Kim | ................ | H04M 1/0266 |
| 9,467,558 B2* | 10/2016 | Lee | ................ | H04M 1/72583 |
| 9,559,740 B2* | 1/2017 | Lee | ................ | H04B 1/3888 |
| 9,582,101 B2* | 2/2017 | Chang | ................ | G06F 1/1677 |
| 2007/0243911 A1* | 10/2007 | Saito | ................ | H04M 1/22 455/575.1 |
| 2010/0016041 A1 | 1/2010 | Ying et al. | | |
| 2011/0065474 A1 | 3/2011 | Won et al. | | |
| 2012/0212430 A1 | 8/2012 | Jung et al. | | |
| 2012/0308981 A1 | 12/2012 | Libin et al. | | |
| 2013/0076614 A1 | 3/2013 | Ive et al. | | |
| 2013/0242505 A1 | 9/2013 | Nguyen et al. | | |
| 2014/0274214 A1* | 9/2014 | Kim | ................ | H04M 1/0266 455/566 |
| 2015/0026623 A1* | 1/2015 | Horne | ................ | G06F 3/04847 715/771 |
| 2015/0193074 A1* | 7/2015 | Cudak | ................ | G06F 3/0418 345/173 |
| 2015/0234581 A1* | 8/2015 | Terrero | ................ | G06F 3/04847 715/863 |
| 2015/0277602 A1* | 10/2015 | Chang | ................ | G06F 1/1677 345/173 |
| 2016/0062415 A1* | 3/2016 | Cudak | ................ | G06F 1/1677 345/173 |

FOREIGN PATENT DOCUMENTS

| | | |
|---|---|---|
| KR | 10-2013-0078378 A | 7/2013 |
| KR | 10-2013-0080574 A | 7/2013 |
| KR | 10-1285669 B1 | 7/2013 |

\* cited by examiner

ELECTRONIC DEVICE AND METHOD OF CONTENT DISPLAY

CLAIM OF PRIORITY

This application claims the benefit under 35 U.S.C. § 119(a) of a Korean patent application filed on May 29, 2014, in the Korean Intellectual Property Office and assigned Serial No. 10-2014-0065393, the entire disclosure of which is hereby incorporated by reference.

TECHNICAL FIELD

1. Field

The present disclosure relates to content output, and more particularly, to an electronic device and a method of displaying content on a display of the electronic device.

2. Description of the Related Art

Electronic devices such as mobile phones or smartphones have been developed to be equipped with a variety of functions and provide various services through the applications.

Since the displays of electronic devices are fragile and may be damaged by external impacts, they can be protected with supplemental covers. Covers may be designed to form one or more open or transparent areas. An "open" area may comprise, for example, any empty space or window in the cover through which a user may gain direct access to the display of the electronic device. In some conventional applications, manufacturers may designate an area of the display corresponding to an open area or transparent area of a cover, such that a digital clock or alarm time, etc. can be displayed on the designated area through the open area or transparent area. In such a case, users can view preset content through the open area or transparent of electronic devices without opening the covers. However, since electronic devices display the manufacturers' selected content on their designated area on the display, the user's settings for displaying content are restricted. In particular, when a cover applied to an electronic device has an open area or transparent area that is not consistent with the manufacturer's designated area of the display, the user cannot see content displayed on the designated area until the user opens the cover.

SUMMARY

The present disclosure has been made in view of the above problems, and provides an electronic device and a method that outputs content on a part of the display area of the electronic device, by adapting the partial display-area to various types of covers.

A device and methods for content display are disclosed. In various embodiments, a method for content display comprises detecting at least one of an open area or a transparent area in a display cover coupled to an electronic device, setting a partial display-area on a display area of the electronic device, where the partial display-area corresponds to the at least one of the open area or the transparent area, setting content to the partial display-area, displaying the content in the partial display-area.

The device may comprise, in various embodiments, a display, an input unit, a sensor module, and a control module for designating a partial display-area, setting content corresponding to the partial display-area, and controlling the display to display the content on the partial display-area.

BRIEF DESCRIPTION OF THE DRAWINGS

The features and advantages of the disclosure will become more apparent from the following detailed description in conjunction with the accompanying drawings, in which.

DETAILED DESCRIPTION

Figure 1:
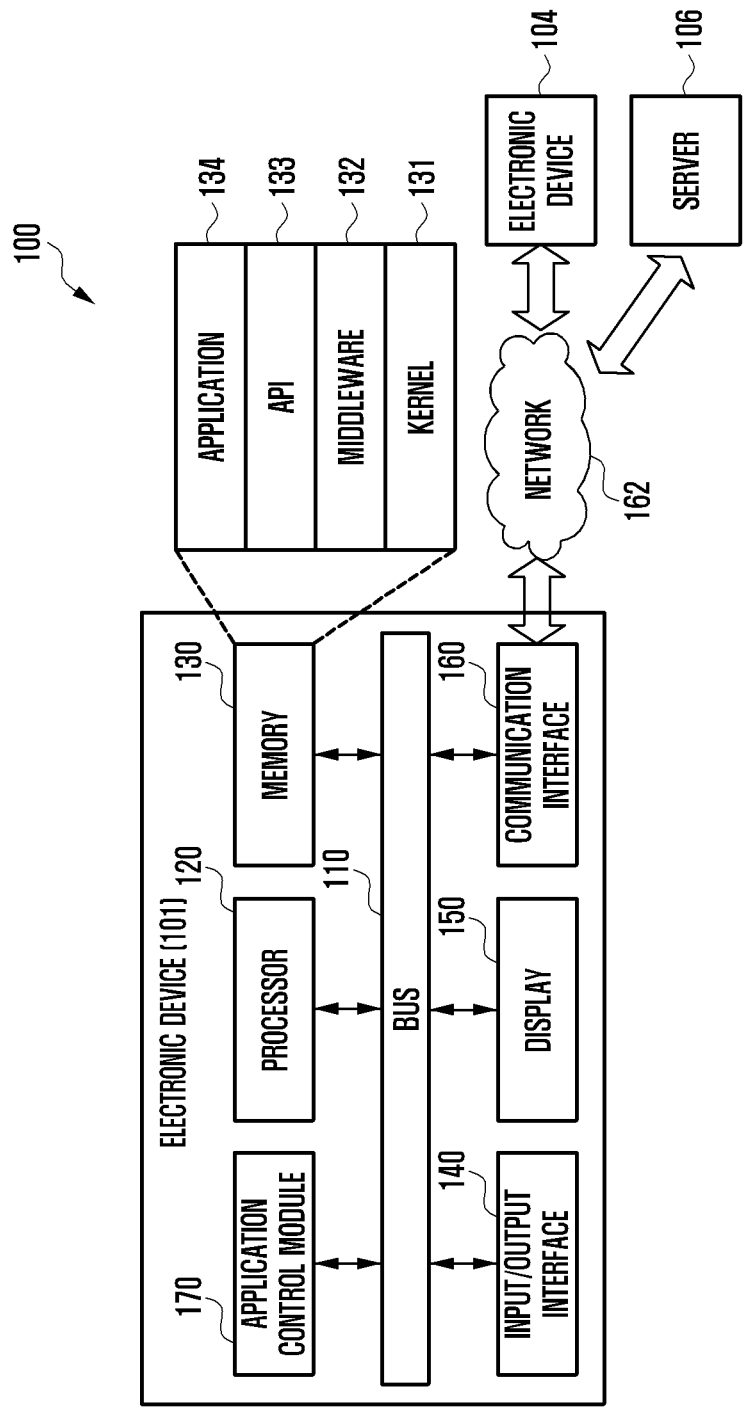
FIG. 1 is a block diagram illustrating, in accordance with various embodiments, a network environment including therein an electronic device.

In the following description, the term 'partial display-area' is defined as a portion of the entire display area of the display of an electronic device. The partial display-area may remain active or turned on, although the electronic device detects that the cover is closed.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the singular forms "a", "an", and "the" are intended to include the plural forms, including "at least one", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram illustrating a network environment 100 including therein an electronic device 101 in accordance with an embodiment of the present disclosure. Referring to FIG. 1, the electronic device 101 may include, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may comprise any tangible, non-transitory, computer-readable medium and may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may enable communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but is not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 101, store such information in the memory 130, and execute the application 134 on the basis of such information. A further description about the application control module 170 will be given hereinafter through FIGS. 2 to 9.

Figure 2:
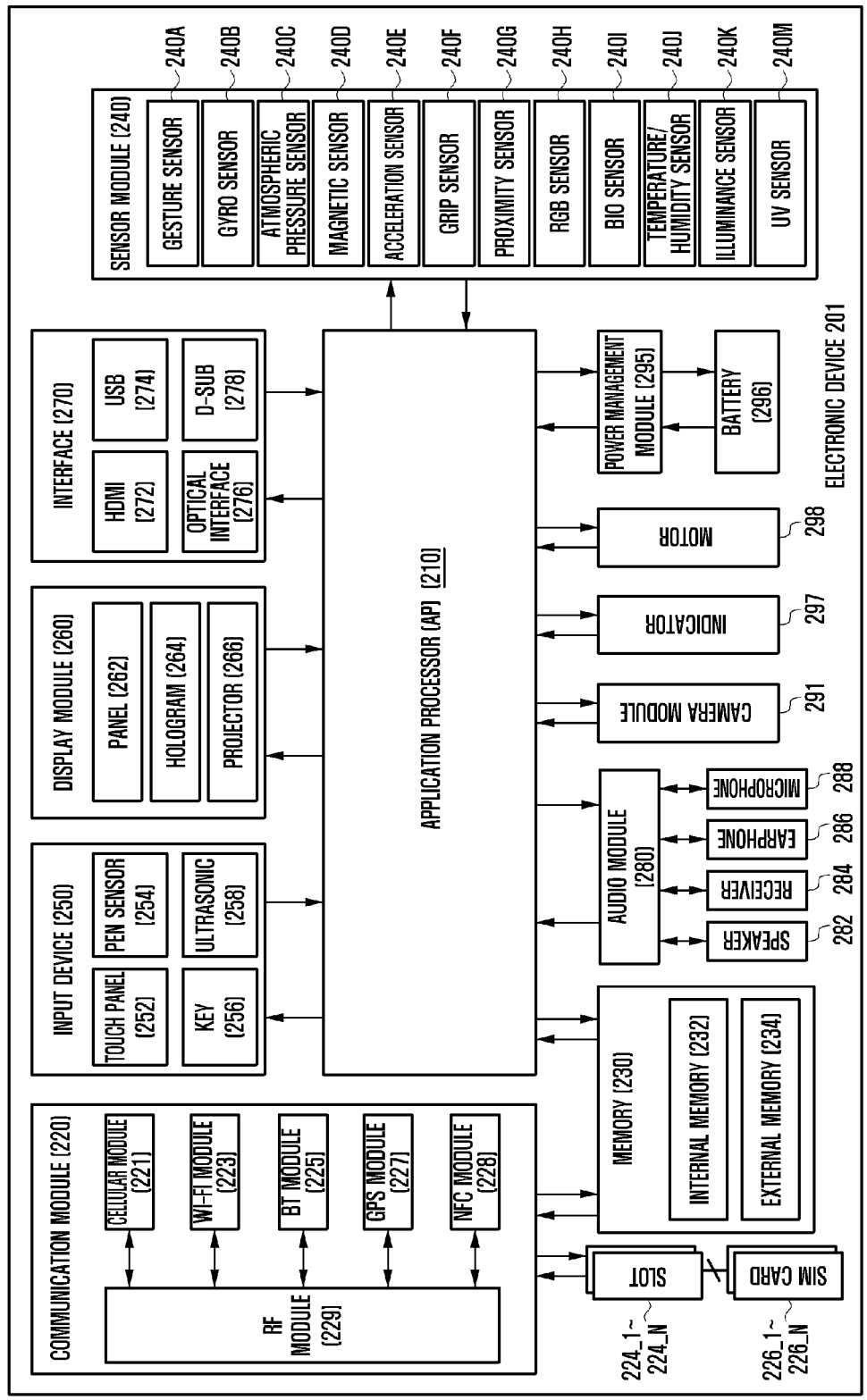
FIG. 2 is a block diagram illustrating, in accordance with various embodiments, an electronic device.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with any unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Figure 3:
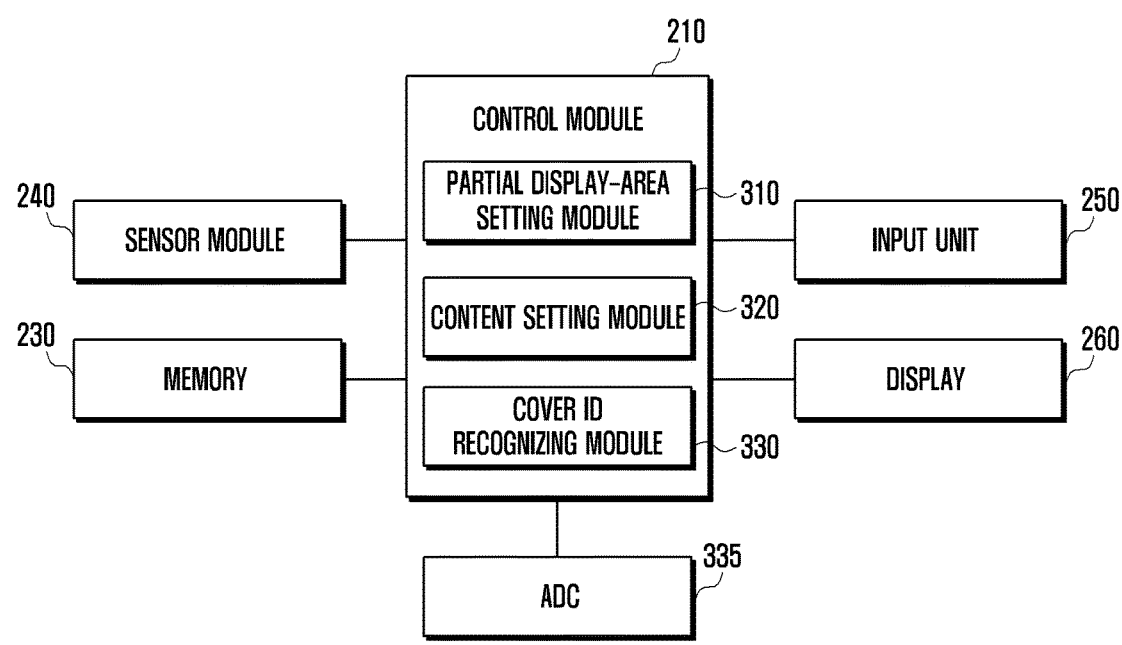
FIG. 3 is a schematic block diagram, in accordance with various embodiments, of a content outputting system of an electronic device.

FIG. 3 is a schematic block diagram of a content outputting system 300 of an electronic device according to an embodiment of the present disclosure.

The content outputting system 300 includes a control module 210, a memory 230, a sensor module 240, an input unit 250, a display 260 and an analog-to-digital converter (ADC) 335.

The content outputting system 300 allows the control module 210 to set a partial display-area and to set content to be displayed on the set partial display-area. The content outputting system 300 detects types of covers for an electronic device 101, sets a partial display-area for the detected type of cover and content for the partial display-area, and stores information related to the settings.

The control module 210 includes a partial display-area setting module 310, a content setting module 320, and a cover identification number (ID) recognizing module 330.

The partial display-area setting module 310 sets a portion of the area of the display 260 that remains active or in an on state while the cover of the electronic device is closed, which may be referred to herein as a partial display-area (as defined above).

The partial display-area setting module 310 may set an area of the display 260, designated by electronic device manufacturers, to a partial display-area. The partial display-area setting module 310 may also set an area of the display 260, designated by the electronic device user, to a partial display-area. Thus, and as described in greater detail below, the partial display-area setting module 310 provides a partial display-area setting mode to the user of the electronic device 101. The electronic device user may therefore set an area to a partial display-area, and may also alter or delete an existing partial display-area in the partial display-area setting mode. The user may, in various embodiments, set, alter, and/or delete a partial display-area using the input unit 250.

The partial display-area setting module 310 may however automatically set a partial display-area based on input received from the sensor module 240. For example, the electronic device 101 determines an open area or transparent area of the cover based on input received from an illuminance sensor 240K. The electronic device 101 may set the partial display-area based upon the input received from the illuminance sensor 240K.

In addition, the electronic device 101 may detect an open or transparent area of the cover based upon input receive from a pressure sensor. The electronic device 101 may set the partial display-area based on the input received from the pressure sensor.

The sensor module 240 may be a module forming a layer in the layered-structure of the display 260. The sensor module 240 detects whether the cover of the electronic device 101 is closed. The sensor module 240 also detects an open area or transparent area of the cover.

As described herein, the partial display-area may be set (or formatted) by the partial display-area setting module 310 to correspond to the dimensions and/or position of the open area of the cover. For example, the partial display-area may be set by the partial display-area setting module 310 to any shape, such as a square, a rectangle, an equilateral triangle, a circular sector, an ellipse, a circle, a cloud shape, a star symbol, etc.

The content setting module 320 sets content to be displayed on a partial display-area. The content setting module 320 may provide, when a partial display-area is set, a list of content to be displayed in the partial display-area. This may occur during a content setting mode. The user of the electronic device 101 may select content to be displayed from the list of content to alter the content set or displayed in the partial display-area. The user may further set content to a partial display-area to which content has yet to be set or displayed.

The content setting module 320 may provide a list of content based on a user's preference. As an example, the content on a list may be arranged in order of a number of runs or accesses (e.g., highest to lowest) on the electronic device 101. As another example, the content on a list may be arranged in order based on a number of times the user has set the listed content to the partial display-area (e.g., highest to lowest).

As described herein, the content setting module 320 identifies the shape of the partial display-area and provides a list of content according to the shape of the partial display-area to the user. The content setting module 320 makes or enters data in a database with data corresponding to the shapes of a user's set partial display-areas and content set for the partial display-areas, and provides a list of content to the user based on the data contained in the database. For example, when a user sets a video as content to a partial display-area shaped as a rectangle, the content setting module 320 makes a database with the video content and the rectangular partial display-area. The database may be stored in the memory 230. In addition, where a partial content display-area comprises a shape (e.g., as detected by the content setting module 320), such as a rectangle, the content setting module 320 may search a list of content stored in the database for content set for or associated with a rectangle, and this list may be displayed or provided to the user via the partial display-area.

In various embodiments, the content setting module 320 provides a list of content to be displayed on a partial display-area based on a user's preference and/or the shape of the partial display-area. More specifically, the content setting module 320 may, in various embodiments, provide a list of content by way of an additional graphical user interface tab sorted by a user's preference or the shape of the partial display-area.

The content setting module 320 thus permits selection of content from the displayed list of content. For example, the content setting module 320 may set for display, a digital clock, an analogue clock, a battery status indicator, a photograph, a slide show, a music player, a video, a mirror, a map, a web page, etc. In another embodiment, when the electronic device 101 is set to display a live preview image of the camera on the partial display-area, the user can see the live preview image, formed on the image sensor by the front lens or rear lens of the electronic device 101, on the partial display-area without opening the cover. In other words, since an area of the cover corresponding to an image sensor of the electronic device 101 is open or transparent, the image sensor is always in an image taking state.

The content setting module 320 may enlarge or reduce the display dimensions of the selected content to correspond to the dimensions of the partial display-area. The content setting module 320 may also align the position of the selected content with that of the partial display-area.

The cover ID recognizing module 330 may identify an ID of a cover applied to the electronic device 101. More particularly, the cover ID recognizing module 330 may obtain ADC values from covers having different electrical resistances by using the ADC 335. The cover ID recognizing module 330 may assign IDs to covers, based on the ADC values obtained from the covers and may store the cover IDs and the ADC values corresponding to the covers in the memory 230.

In various embodiments, in response to the application of a cover to an electronic device 101, the cover ID recognizing module 330 compares the ADC value of the cover with the stored ADC value. When the cover ID recognizing module 330 ascertains or determines that the ADC value of the cover is consistent with or matches the stored ADC value, it locates, within the database, the associated cover ID.

The cover ID recognizing module 330 matches the partial display-area and the content to be displayed on the partial display-area to the matched cover ID, and stores them in the memory 230. This process enables the cover ID recognizing module 330 to detect an ID of a cover applied to the electronic device 101 and to read the partial display-area and the content to be displayed on the partial display-area, corresponding to the cover ID, from the memory 230. Therefore, electronic device users do not need to repeatedly set a partial display-area and the content to be displayed on the partial display-area to the electronic device 101 each time the cover is removed from and then coupled to the electronic device 101. Rather, when the electronic device 101 detects that the cover is closed, it reads the content and information about the partial display-area, stored in the memory according to the cover ID, from the memory and displays the content on the partial display-area.

As described above 4, the control module 210 detects whether the cover is closed using the sensor module 240. For example, the control module 210 may detect a magnetic field generated by the cover using the magnetic sensor 240D (shown in FIG. 2) to determine whether the cover is closed.

When the control module 210 ascertains or determines that the cover is closed, it may turn all or a portion of the display 260 on or off. For instance, when the control module 210 ascertains or determines that the cover is closed, it switches the display mode to a partial display-area displaying mode, so that the partial display-area is turned on and the remaining display area is turned. In various embodiments, when the cover of the electronic device 101 is not closed, the control module 210 may not turn the display 260 off. In various embodiments, when the cover of the electronic device 101 is closed, the control module 210 may control the display 260 to switch the display mode to a partial display-area displaying mode and to display preset content on the preset partial display-area.

In addition, and in various embodiments, although the control module 210 may detect that the cover is closed, it may not switch the display mode to a partial display-area displaying mode. For example, when a user needs to set a partial display-area in a partial display-area setting mode, the control module 210 may continue running the partial display-area setting mode while the cover is closed. To illustrate, users may manually set a partial display-area in a state where the cover of the electronic device 101 is closed. This is because users may not correctly detect an open area or transparent area of a cover in a state where the cover is open. That is, users may correctly set a partial display-area in a state where the cover is closed.

In various embodiments, the control module 210 may automatically set a partial display-area by using the sensor module 240 in a state where the cover of the electronic device 101 is closed. Since the control module 210 detects the front of the display 260 as an open area or transparent area when the cover is open, it may not correctly detect a partial display-area. Therefore, the control module 210 may correctly set a partial display-area by using the sensor module 240 in a state where the cover of the electronic device 101 is closed.

In embodiments, the electronic device includes a display, an input unit, a sensor module, and a control module for designating a partial display-area, setting content corresponding to the partial display-area, and controlling the display to display the content on the partial display-area.

The control module receives a user's touch event or input signal and designates the partial display-area by the user's touch event or input signal.

The control module detects an open area or transparent area of a cover through the sensor module and designates the partial display-area corresponding to the open area or transparent area.

The control module selects at least a portion of the partial display-area, selects content corresponding to the selected portion of partial display-area, and adjusts the size or location of the content to meet the selected portion of partial display-area.

The control module detects the closure of the cover through the sensor module and runs the electronic device in a partial display-area displaying mode.

The control module controls the display to turn on the partial display-area and to display the content on the partial display-area in the partial display-area displaying mode.

The electronic device further includes an analog-to-digital converter (ADC) for obtaining an ADC value corresponding to a resistance of the cover. The control module designates an ID of the cover to the ADC value and determines whether the cover ID is a stored cover ID.

The control module reads, when the cover ID is a stored cover ID, a partial display-area and content, stored associating with to the cover ID and outputs, when the cover is closed, the stored content on the stored partial display-area.

The control module designates, when the cover ID is a new cover ID, the partial display-area, sets content corresponding to the partial display-area, and stores the partial display-area and the content, associating with the cover ID.

Figure 4:
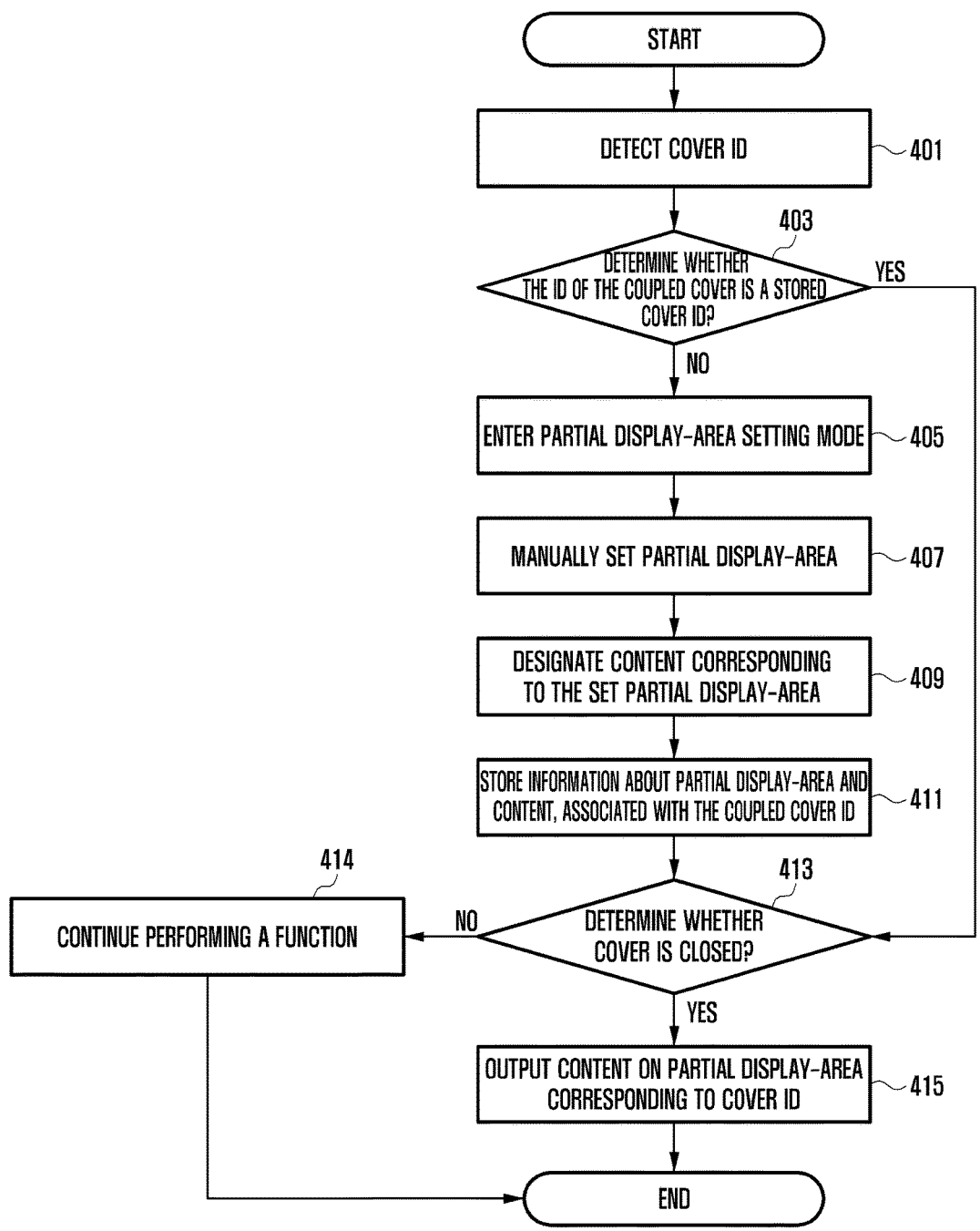
FIG. 4 is a flow chart that describes, in accordance with various embodiments, a method of setting a partial display-area of the display area of an electronic device and content in a manual mode and displaying the set content on the set partial display-area.

FIG. 4 shows, in accordance with various embodiments, a flowchart that describes a method of setting a partial display-area of the display area of an electronic device 101 as well as content to be displayed in the partial display-area, in a manual mode and displaying the set content on the set partial display-area.

Accordingly, when a cover is applied to the electronic device 101 disclosure, the electronic device 101 detects an ID of the cover (401). The ID of the cover may be associated with an ADC value as described herein. For instance, the electronic device 101 may obtain ADC values of covers having different electrical resistances based upon an electrical resistance associated with a particular cover, as detected or measured by the ADC 335. Since the ADC values obtained by the ADC 335 are different from each other, each ADC value corresponding to the resistance of one of a plurality of various covers, the electronic device 101 may distinguish each of the various covers from any other cover based upon the obtained ADC value. In various embodiments, store the ADC values associated with IDs of the covers may also be stored by the electronic device 101 (e.g., in the memory 230).

In various embodiments, the electronic device 101 compares the ADC value of the coupled cover with ADC values that have been stored (e.g., as described above). When the ADC value of the coupled cover is consistent with or matches a stored ADC value, the electronic device 101 concludes or determines that it has been coupled with the cover. When, in contrast, the ADC value of the coupled cover differs from the stored ADC value, the electronic device 101 assigns an ID to the coupled cover and stores the cover ID and the ADC value (e.g., in the memory 230) in association with each other.

The electronic device 101 thus determines whether the ID of the coupled cover is a stored cover ID (403).

In the event that the electronic device 101 ascertains or determines that the ID of the coupled cover is not a stored cover ID (i.e., that it is a new cover ID), the electronic device 101 enters a partial display-area setting mode (405). The electronic device 101 may further provide a notification to the user, asking whether the user wishes to set or configure a partial display-area.

In various embodiments, when the electronic device 101 ascertains or determines that the ID of the coupled cover is such a new cover ID, the electronic device 101 may automatically enter a partial display-area setting mode without any notification, as in operation 405.

Thus, when the electronic device 101 is coupled with a cover, a partial display-area may be set for a first time and/or an existing partial display-area may be altered in the partial display-area setting mode The electronic device 101 may therefore receive a selection, by a user, of a partial display-area. In other words, the user may manually set, select, or configure the partial display-area (407). To elaborate, to configure the partial display-area, the electronic device 101 receives a user's touch event or input signal through the input unit 250. The electronic device 101 sets a partial display-area based on pixel coordinates or a trace corresponding to the user's touch event or input signal.

In various embodiments, the electronic device 101 sets or formats a partial display-area while the cover is closed. Although the electronic device 101 may detect the closure of the cover during the process of setting a partial display-area, it may not switch the current mode to a partial display-area displaying mode (e.g., as described below).

As used herein, the phrase "partial display-area displaying mode" refers to a mode where the electronic device 101 detects the closure of the cover, turns on or displays only the partial display-area of the display 260. In various embodiments, the electronic device 101 may display preset content on the partial display-area. Therefore, when the user sets a partial display-area in the partial display-area setting mode, although the cover is closed, the electronic device 101 continues running the partial display-area setting mode so that the user can set the partial display-area, without switching the current mode to a partial display-area displaying mode (in operation 415). The user may not correctly detect an open area or transparent area of the cover in a state where the cover is open. That is, the user may find it more convenient to correctly set a partial display-area when the cover is closed rather than open.

In various embodiments, the electronic device 101 sets or formats a partial display-area when the cover is open. However, it may be difficult for a user to detect or identify a correct open area or correct transparent area of the cover in a state where the cover is open. In order to overcome the difficulty, the electronic device 101 may additionally correct the partial display-area that the user is inputting while the cover is open. For example, when the electronic device 101 ascertains or determines that the degree of similarity (consistency) between the user's input partial display-area and the open area or transparent area of the cover detected by the sensor module is greater than or equal to a preset value, it automatically corrects and displays the user's input partial display-area. That is, when the degree of similarity (consistency) between the user's input partial display-area and the open area or transparent area of the cover detected by the sensor module is greater than or equal to a preset value, the electronic device 101 automatically corrects the user's input partial display-area so that it corresponds to the open area or transparent area of the cover in size and position. When the partial display-area is not consistent with the open area or transparent area of the cover, the electronic device 101 may further perform a process asking the user whether to correct or leave the inconsistent state.

The electronic device 101 may set (e.g., adjust or format) the input partial display-area in a state where the cover is open or closed in operation 407. For example, the electronic device 101 may move the input partial display-area. The electronic device 101 may also enlarge or reduce the input partial display-area. For example, the electronic device 101 may enlarge or reduce the input partial display-area in size, maintaining the aspect ratio, in operation 407. The electronic device 101 may also enlarge or reduce the input partial display-area in size, regardless of the aspect ratio, in operation 407. The electronic device 101 thus sets or formats content to be displayed on the set partial display-area (409).

When a partial display-area has been set or formatted, the electronic device 101 provides the user, during a content setting mode, with a list of content to be displayed on the partial display-area. The electronic device 101 provides a content setting mode to the user, so that the user can set or select content to be displayed on the partial display-area. During a content setting mode, the user of the electronic device 101 may alter content that has been set to new or other content or may set content to the partial display-area where content has not yet been set.

The electronic device 101 may provide a list of content to be displayed on the partial display-area according to a user's preference. For example, the content on a list may be arranged in order of highest to lowest number of content runs (accesses) on the electronic device 101. The content on a list may also be arranged in order of highest to lowest number of content setting processes to the partial display-area.

The electronic device 101 may detect the dimensions (e.g. the shape and size) of the partial display-area and may provide a list of content suitable to or associated with the detected dimensions to the user. The electronic device 101 may thus store or generate a database with shapes of a user's set partial display-areas and content set for the partial display-areas, and provide a list of content to the user based on the database. For example, as described above, when a user sets a video as content to a partial display-area shaped as a rectangle, the electronic device 101 may generate or update a database to associate the video content with the rectangular partial display-area.

In various embodiments, the electronic device 101 provides a list of content to be displayed on a partial display-area based on a user's preference and/or the shape of the partial display-area. More specifically, the electronic device 101 provides a list of content by way of an additional GUI tab. As described above the list may include content settings such as for example, a digital clock, an analogue clock, a battery status indicator, a photograph, a slide show, a music player, a video, a mirror, a map, a web page, etc. on the partial display-area.

In addition, as outlined above, the electronic device 101 may enlarge or reduce the selected content to correspond in dimension with the dimensions (e.g., size, position, shape, etc.) of the partial display-area. For instance, the electronic device may adjust a size of the partial display-area and/or align the position of the selected content to that of the partial display-area in operation 409. In addition, the electronic device 101 may optimize and align the content in size and position to meet the partial display-area with or without manual input by a user.

The electronic device 101 may also alter attributes of the selected content so that it can be displayed on the partial display-area in operation 409. For example, the electronic device 101 may change the font style and size, text color, etc. included in. The electronic device 101 stores information about the partial display-area and content, associated with the ID of the coupled cover (411). The stored information about the partial display-area and content is used to read the partial display-area and the content (both corresponding to the cover ID of the coupled cover) when the cover is coupled to the electronic device 101. The electronic device 101 may further determine whether the cover is closed using the sensor module 240 (413). For example, the electronic device 101 may detect a magnetic field from generated by the cover using the magnetic sensor 240D to determine whether the cover is closed (e.g., based on the magnetic field detection).

When the electronic device 101 ascertains or determines that the cover is open in operation 413, it keeps the display 260 running in a general display mode (which may refer to an output mode where the cover is not closed), so that the display 260 displays a screen corresponding to a user's requested function or operation (414).

However, when the electronic device 101 ascertains or determines that the cover is closed in operation 413, it runs a partial display-area displaying mode (415). For example, the partial display-area displaying mode refers to a mode where the electronic device 101 detects the that the cover is close, turns on only the partial display-area of the display 260, and displays preset content on the partial display-area. Therefore, when the electronic device 101 ascertains or determines that the cover is closed, it switches the display mode to a partial display-area displaying mode, so that the partial display-area of the display 260 is turned on and the other (covered) display area is turned off. The electronic device 101 reads, from the memory 230, the partial display-area and content associated with the ID of the cover, in the partial display-area displaying mode and displays the content on the partial display-area in operation 415. In addition, when the electronic device 101 ascertains or determines that the ID of the coupled cover is a stored cover ID in operation 403, it determines whether the cover is closed in operation 413.

Figure 5:
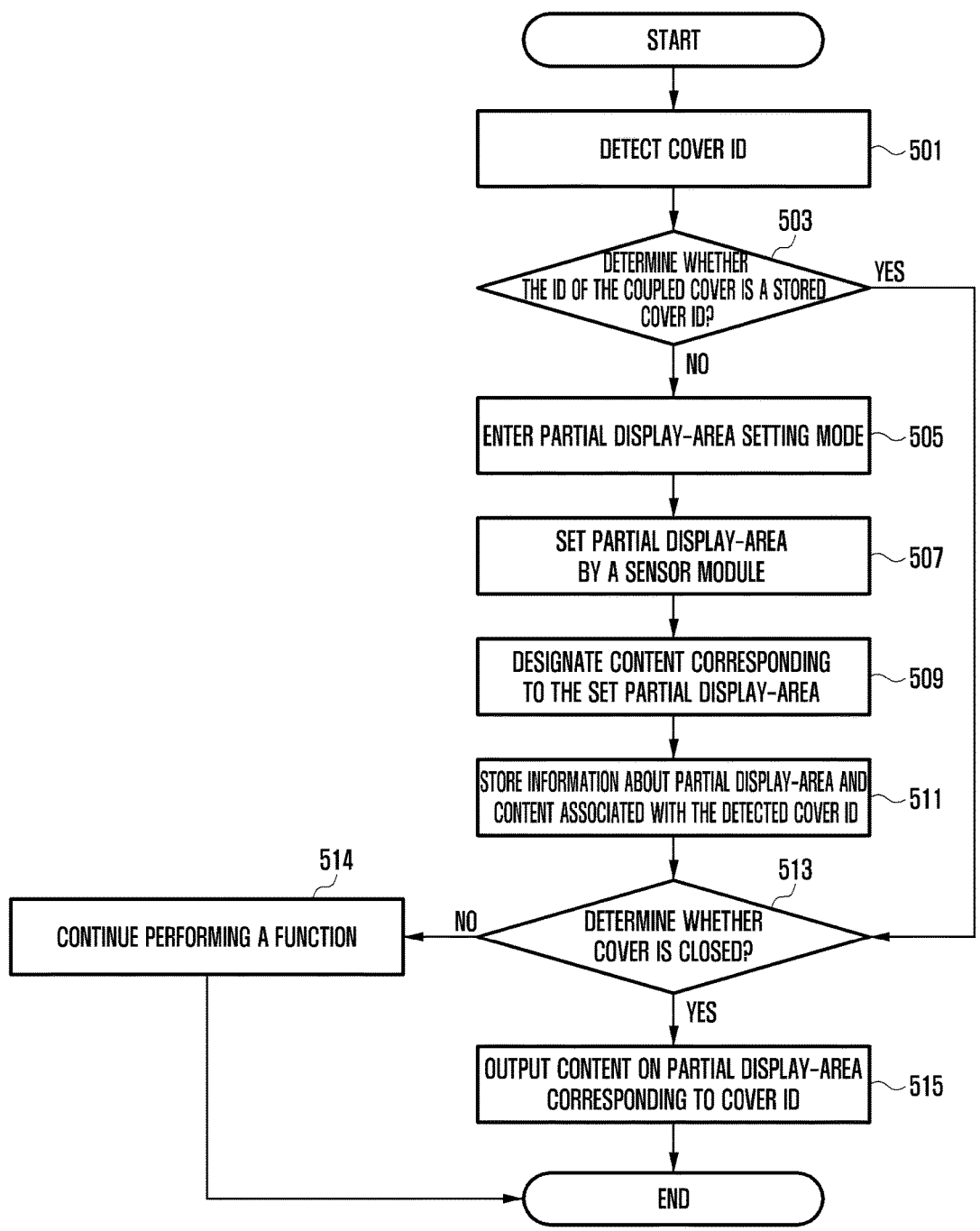
FIG. 5 is a flow chart that describes, in accordance with various embodiments, a method of automatically setting a partial display-area of the display area using a sensor module by an electronic device and displaying corresponding content on the set partial display-area.

FIG. 5 is a flow chart that describes a method of automatically setting a partial display-area of the display area using a sensor module and displaying corresponding content on the set partial display-area.

When a cover is applied to the electronic device 101 according to an embodiment of the present disclosure, the electronic device 101 detects an ID of the cover (501). As described herein, the electronic device 101 obtains ADC values of covers with different electrical resistances by way of the ADC 335. Since the ADC values obtained by the ADC 335 are different from each other (corresponding to different electrical resistances of different covers), the electronic device 101 may distinguish a variety of covers based on the obtained ADC values and/or, in various embodiments, store the ADC values associated with IDs of the covers.

As described herein, the electronic device 101 compares the ADC value of the coupled cover with ADC values that have been stored to the memory 230. When the ADC value of the coupled cover is consistent with a stored ADC value, the electronic device 101 concludes or determines that it has been coupled with the particular cover. However, when the ADC value of the coupled cover differs from any stored ADC value, the electronic device 101 assigns a cover ID to the coupled cover and stores the cover ID and the ADC value together to the memory 230. The electronic device 101 thus determines whether the ID of the coupled cover is a stored cover ID (503).

When the electronic device 101 ascertains or determines that the ID of the coupled cover is not a stored cover ID, i.e., a new cover ID in operation 503, it enters a partial display-area setting mode (505).

In various embodiments, when the electronic device 101 ascertains or determines that the ID of the coupled cover is a new cover ID in operation 503, it may provide a notification to the user, asking whether the user wishes to set a partial display-area. However, in various embodiments, when the electronic device 101 ascertains that the ID of the coupled cover is a new cover ID in operation 503, it may automatically switch to a partial display-area setting mode without any notification to the user (505). When the electronic device 101 is coupled with a cover, a partial display-area may be newly set or altered in the partial display-area setting mode in operation 505.

The electronic device 101 may automatically set a partial display-area using the sensor module 240 (507). For example, the electronic device 101 may distinguish between an open area or transparent area and a closed area or opaque area of the cover based upon signals received from the illuminance sensor 240K. The signal may correspond to or otherwise indicate an amount of light detected by the illuminance sensor 240K. The electronic device 101 automatically separates an area corresponding to the open area or transparent area from the other areas of the display based on the signals of the illuminance sensor 240K and automatically sets the separated area as a partial display-area.

In addition, the electronic device 101 may also distinguish between an open area or transparent area and a closed area or opaque area of the cover through a pressure sensor. The electronic device 101 automatically separates an area corresponding to the open area or transparent area from the other areas of the display based on the signals of the pressure sensor and automatically sets the separated area as a partial display-area. The sensor module 240 may be a module forming a layer in the layered-structure of the display 260. The sensor module 240 thus detects whether the cover of the electronic device 101 is closed. The sensor module 240 also detects an open area or transparent area of the cover.

Having entered a partial display-area setting mode, the electronic device 101 sets a partial display-area (e.g., when the cover is closed) in operation 507. The partial display-area may be set to correspond to the dimensions (e.g., shape, size, position, etc.) of the open area and/or transparent area of the cover, e.g., a square, a rectangle, an equilateral triangle, a circular sector, an ellipse, a circle, a cloud shape, a star symbol. The electronic device 101 thus sets content to be displayed on the set partial display-area (509).

As described above, when a partial display-area has been set, the electronic device 101 provides the user with a list of content to be displayed on the partial display-area. The electronic device 101 provides a content setting mode to the user, so that the user can set content to be displayed on the partial display-area. In various embodiments, the electronic device 101 provides the user with a list of content to be displayed on the partial display-area. In a content setting mode, the user of the electronic device 101 may alter content that has been set to new content or may set content to the partial display-area where content has not been set.

The electronic device 101 may, in addition and as described elsewhere herein, provide a list of content to be displayed on the partial display-area according to a user's preference. For example, the content on a list may be arranged in order of highest to lowest number of content runs (accesses) on the electronic device 101. The content on a list may also be arranged in order of highest to lowest number of content setting processes to the partial display-area.

The list of content provided to the user may be based upon dimensional information association with the partial display-area (e.g., a size, shape, position, etc. of the partial display-area). The electronic device 101 may generate or alter a database that includes such dimensional information as well as a user's set partial display-areas and content set for the partial display-areas. The electronic device may further provide a list of content to the user based on the data/information contained in the database. For example, when a user sets a video as content to a partial display-area shaped as a rectangle, the electronic device 101 may generate or alter a database with the video content and the rectangular partial display-area. More particularly, when the user sets a partial display-area to a shape of a rectangle, the electronic device 101 detects that the partial display-area is a rectangle, searches a list of content stored in database for content set for a rectangle, and provides a list of content corresponding to a rectangle to the user.

Example content displayed by the electronic device 101 in the list may include a digital clock, an analogue clock, a battery status indicator, a photograph, a slide show, a music player, a video, a mirror, a map, a web page, etc.

The electronic device 101 may enlarge or reduce the size, shape, position etc. of the selected content to correspond to the size, shape, position of the partial display-area. The electronic device may also align the position of the selected content to that of the partial display-area in operation 509. For example, the electronic device 101 enlarges or reduces the content in size and also aligns the content in position, according to a user's touch event or input signal. In addition, the electronic device 101 optimizes and aligns the content in size and position to meet the partial display-area without a user's manual operation.

The electronic device 101 may also alter attributes of the selected content so that it can be displayed on the partial display-area in operation 509. For example, the electronic device 101 may change the font style and size, text color, etc. included in content. The electronic device 101 stores information about the partial display-area and content in association with the cover ID of the coupled cover (511). In various embodiments, and as described elsewhere herein, the electronic device 101 determines whether the cover is closed (e.g., using data obtained from the sensor module 240) (513). For example, the electronic device 101 may detect a magnetic field generated by the cover using the magnetic sensor 240D and determine, based on the magnetic field, whether the cover is closed.

When the electronic device 101 ascertains or determines that the cover is open in operation 513, it may keep the display 260 running in a general display mode (which may refer to an output mode where the cover is not closed), so that the display 260 displays a screen corresponding to a user's requested function or operation (514).

However, when the electronic device 101 ascertains or determines that the cover is closed in operation 513, it runs a partial display-area displaying mode (operation 515). For example, the partial display-area displaying mode refers to a mode where the electronic device 101 detects that the cover is closed, activates or turns on only the partial display-area of the display 260 and displays preset content on the partial display-area. Therefore, when the electronic device 101 ascertains or determines that the cover is closed, it switches the display mode to a partial display-area displaying mode, so that the partial display-area of the display 260 is turned on and the other display area is turned off.

The electronic device 101 reads the partial display-area and content associated with the cover ID from the memory 230 and displays the content on the partial display-area in operation 515.

Figure 6:
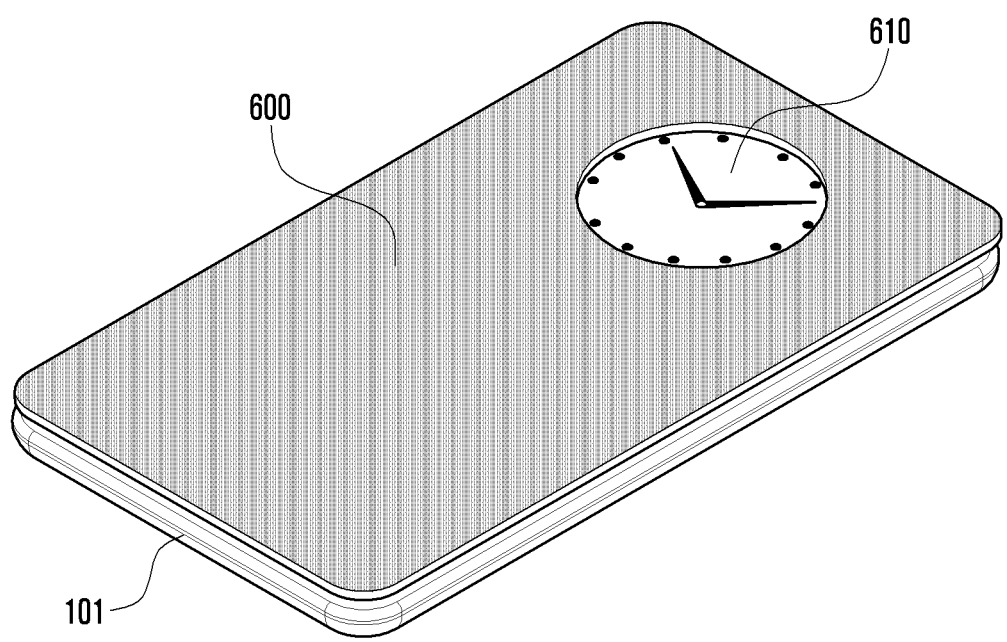
FIG. 6 is, in accordance with various embodiments, a view of a first cover applied to an electronic device outputting content on a partial display-area of the display area.

FIG. 6 is a view of a first cover 600 applied to an electronic device 101. As shown, the electronic device 101 runs in a partial display-area displaying mode (operation 415 or 515). Reference number 610 refers to a partial display-area of the display area corresponding to the first cover 600. As described herein, the electronic device 101 may directly receive the partial display-area 610 from the user. The electronic device 101 may also automatically set the partial display-area 610 through the sensor module 240.

The electronic device 101 may display preset content in the partial display-area 610. For example, as shown in FIG. 6, the electronic device 101 may output an analog clock with a circular face on the partial display-area 610.

The electronic device 101 may display a selectable list of content in the partial display-area 610. For example, the electronic device 101 may display a digital clock, an analogue clock, a battery status indicator, a photograph, a slide show, a music player, a video, a mirror, a map, a web page, etc. on the partial display-area 610.

Figure 7:
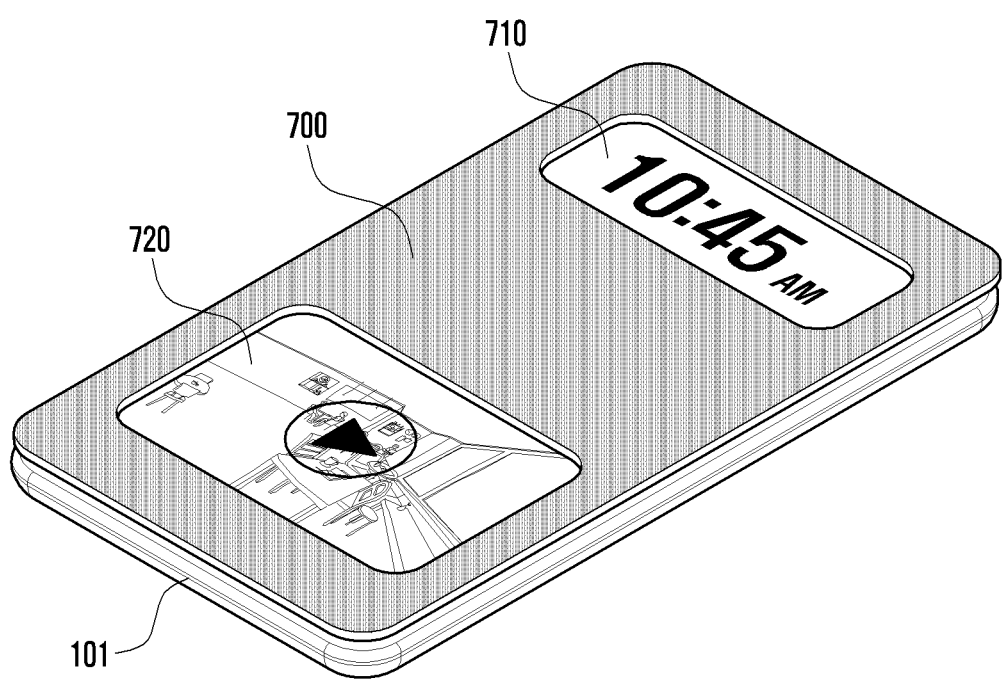
FIG. 7 is, in accordance with various embodiments, a view of a second cover applied to an electronic device outputting content on a partial display-area of the display area.

FIG. 7 is a view of a second cover 700 applied to an electronic device. As shown, 710 refers to a first partial display-area of the display area corresponding to the second cover 700. The electronic device 101 may directly receive the first partial display-area 710 from the user. The electronic device 101 may automatically set the first partial display-area 710 through the sensor module 240.

The electronic device 101 may display a first preset content item on the first partial display-area 710. For example, the electronic device 101 may output a digital clock on the first partial display-area 710. The electronic device 101 may further set or establish a number of partial display-areas in the display area. In such a case, the electronic device 101 may display content on each of number of partial display-areas based, for example, upon the cover id associated with the cover 700, the dimensions of each cover opening or transparent area, and the like (as described herein). For example, reference number 720 refers to a second partial display-area of the display area corresponding to the second cover 700. The electronic device 101 may directly receive the second partial display-area 720 from the user. The electronic device 101 may automatically set the second partial display-area 720 through the sensor module 240. The electronic device 101 may display a second preset content item on the second partial display-area 720. For example, as shown in FIG. 7, the electronic device 101 may output a video on the second partial display-area 720.

The electronic device 101 may also display the same content on the first partial display-area 710 and the second partial display-area 720. The cover applied to the electronic device 101 may be designed in such a way that the body is white and forms a number of through-holes. In such a case, when an image in black is set as content to be displayed on the partial display-area and the electronic device 101 outputs the black image on the partial display-areas, the appearance displays black dots on the white back ground, like a Dalmatian pattern.

Figure 8:
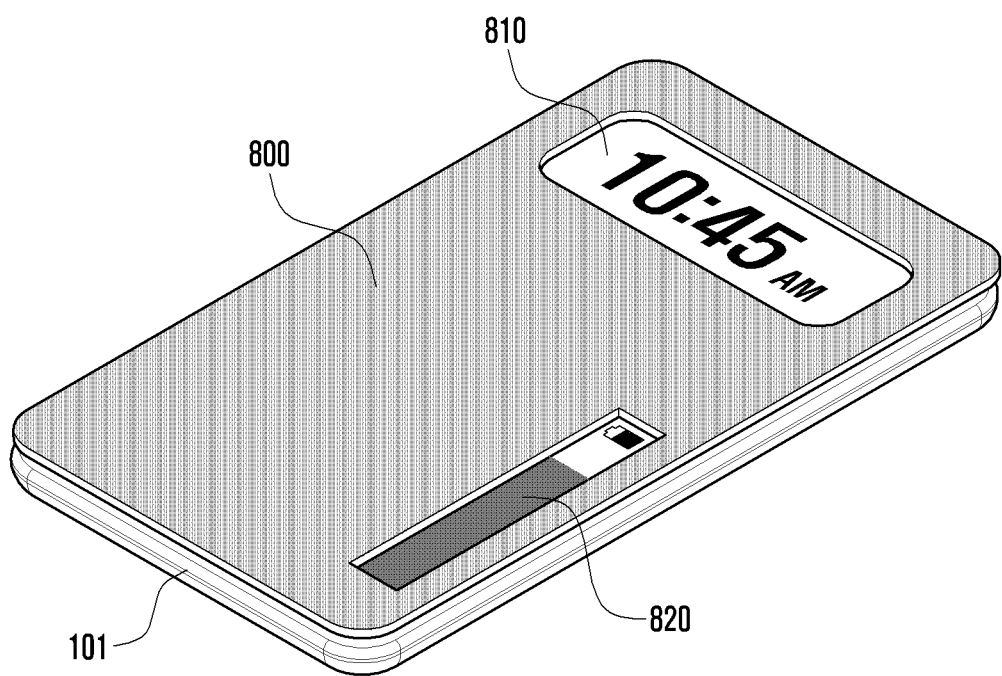
FIG. 8 is, in accordance with various embodiments, a view of a third cover applied to an electronic device outputting content on a partial display-area of the display area.

FIG. 8 is a view of a third cover 800 applied to an electronic device.

Reference number 810 refers to a first partial display-area of the display area corresponding to the third cover 800. The electronic device 101 may directly receive the first partial display-area 810 from the user. The electronic device 101 may also automatically set the first partial display-area 810 based on data received from the sensor module 240.

The electronic device 101 may display a first preset content item on the first partial display-area 810. For example, as shown in FIG. 8, the electronic device 101 may output a digital clock on the first partial display-area 810. The electronic device 101 may further set or establish a number of partial display-areas on the display area. In such a case, the electronic device 101 may display content in each of the number of the partial display-areas based for example, upon the cover id associated with the cover 800, the dimensions of each cover opening or transparent area, and the like (as described herein).

Reference number 820 refers to a second partial display-area of the display area corresponding to the third cover 800. The electronic device 101 may directly receive the second partial display-area 820 from the user. The electronic device 101 may automatically set the second partial display-area 820 based on data received from the sensor module 240. The electronic device 101 may display a second preset content item on the second partial display-area 820. For example, as shown in FIG. 8, the electronic device 101 may output a battery status indicator on the second partial display-area 820.

In embodiments, the method of outputting content in an electronic device includes: setting a partial display-area on a display area of the electronic device; setting content corresponding to the partial display-area; and displaying the content on the partial display-area.

The process of setting a partial display-area includes: running a partial display-area setting mode; receiving a touch event or input signal from a user; setting the partial display-area corresponding to the touch event of input signal.

The process of setting a partial display-area includes: running a partial display-area setting mode; detecting an open area or transparent area of a cover through a sensor module; and setting the partial display-area corresponding to the open area or transparent area.

The process of setting content includes: selecting one or more of the partial display-areas; selecting content corresponding to the selected partial display-area; and adjusting the content in size or position to meet the selected partial display-area.

The process of displaying the content includes: detecting the closure of a cover; and switching a current mode to a partial display-area displaying mode.

The process of switching a current mode to a partial display-area displaying mode includes: turning on only the partial display-area; and displaying the content on the partial display-area.

The process of detecting the closure of a cover includes: detecting the presence of a magnetic field of a magnet attached to the cover through a magnetic sensor.

The method further includes: coupling a cover to the electronic device; setting an identification number (ID) to the cover; and determining whether the cover ID is a cover ID that has been stored.

The method further includes: reading, when the cover ID is a cover ID that has been stored, a partial display-area and content, stored to be associated with the cover ID; and displaying, when the cover is closed, the content on the partial display-area.

The method further includes: setting, when the cover ID is new, the partial display-area; setting content to be associated with the partial display-area; and storing the partial display-area and content, associated with the cover ID.

The process of setting an identification number (ID) to the cover includes: obtaining an analog-to-digital converter (ADC) value corresponding to a resistance of the cover; and setting the cover ID corresponding to the ADC value.

As described above, the device and methods disclosed herein permit the device to output for display a user's desired content on a user's desired area on a display of the device with any of a variety of cover types/shapes/configurations.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitutes hardware in the claimed invention. Under the broadest reasonable interpretation, the appended claims constitute statutory subject matter in compliance with 35 U.S.C. §101. Although exemplary embodiments of the disclosure have been described in detail above, it should be understood that many variations and modifications of the basic inventive concept herein described, which may be apparent to those skilled in the art, will still fall within the spirit and scope of the exemplary embodiments of the disclosure as defined in the appended claims.

What is claimed is:

1. An electronic device comprising:
   a display;
   an input unit;
   a sensor module; and
   a control module configured to:
      detect at least one of an open area or a transparent area in a display cover coupled to the electronic device,
      setting a partial display-area corresponding to the at least one of the open area or the transparent area on a display of the electronic device, wherein the partial display area is set according to a user's touch input received on the display,
      set content corresponding to the partial display-area, and
      control the display to display the content on the partial display-area,
      wherein a user trace comprising the user's touch input is received while the display cover is open, and wherein detecting further comprises comparing the similarity between the user trace with the open area of the transparent area of the display cover, and when a degree of similarity between the user trace and the open area or the transparent area of the display cover is greater than or equal to a preset value, correcting the user trace to correspond to the open area or the transparent area of the cover.

2. The electronic device of claim 1, wherein the control module is configured to select a portion of the partial display area, select content corresponding to the selected portion of the partial display area, and adjust at least one of a size or location of the content to correspond to at least one of a size or location of the selected portion of the partial display-area.

3. The electronic device of claim 1, wherein the control module is configured to detect that the cover is closed on the electronic device through the sensor module and run the electronic device in a partial display-area displaying mode.

4. The electronic device of claim 3, wherein the control module is configured to control the display to turn on the partial display-area and to display the content in the partial display-area.

5. The electronic device of claim 1, further comprising:
   an analog-to-digital converter (ADC) for obtaining an ADC value corresponding to an electrical resistance of the cover,
   wherein the control module is configured to associate a cover ID with the ADC value and determine whether the cover ID is a stored cover ID.

6. The electronic device of claim 1, wherein the control module is configured to designate, when a cover ID is not a stored cover ID, the partial display-area, set content corresponding to the partial display-area, and store the partial display-area and the content in association with the cover ID.

7. The electronic device of claim 1, wherein set the content further comprises:
   presenting a list of content to the user; and
   receiving a selection from the user, the selection selecting the content from the list, and
   wherein the content list includes content based on prior accesses by the user.

8. The electronic device of claim 7, wherein the selected content comprises a video.

9. The electronic device of claim 8, wherein displaying the selected content in the partial display area comprises displaying the video in the partial display area.

10. A method for content display, the method comprising:
    detecting at least one of an open area or a transparent area in a display cover coupled to an electronic device;
    setting a partial display-area corresponding to the at least one of the open area or the transparent area on a display of the electronic device, wherein the partial display area is set according to a user's touch input received on the display;
    setting content to the partial display-area; and
    displaying the content in the partial display-area; and
    wherein a user trace comprising the user's touch input is received while the display cover is open, and wherein detecting further comprises comparing the similarity between the user trace with the open area or the transparent area of the display cover, and when a degree of similarity between the user trace and the open area or the transparent area of the display cover is greater than or equal to a preset value, correcting the user trace to correspond to the open area or the transparent area of the display cover.

11. The method of claim 10, wherein setting the partial display-area comprises running a partial display-area setting mode.

12. The method of claim 10, wherein setting content comprises:
  selecting content corresponding to the partial display area; and
  adjusting the selected content in at least one of size or position to correspond to at least one of the size or position of the partial display-area.

13. The method of claim 10, wherein the displaying the content comprises:
  detecting that the display cover is closed on the electronic device; and
  entering a partial display-area displaying mode.

14. The method of claim 13, further comprising turning on only the partial display-area.

15. The method of claim 13, wherein detecting that the display cover is closed on the electronic device comprises detecting presence of a magnetic field produced by a magnet attached to the display cover.

16. The method of claim 10, further comprising:
  setting a cover identification number (cover ID) to the display cover; and
  determining whether the cover ID is a cover ID that has been stored.

17. The method of claim 16, further comprising:
  setting, in response to determining that the cover ID has not been stored, the partial display-area;
  setting the content to be associated with the partial display-area; and
  storing the partial display-area and the content in association with the cover ID.

18. The method of claim 16, wherein the setting an identification number (ID) to the display cover comprises:
  obtaining an analog-to-digital converter (ADC) value corresponding to a resistance of the display cover; and
  setting the cover ID in association with the ADC value.

19. The method of claim 10, wherein setting the content further comprises:
  presenting a list of content to the user; and
  receiving a selection from the user, the selection selecting the content from the list, and
  wherein the content list includes content based on prior accesses by the user.

20. The method of claim 19, wherein the selected content comprises a video.

21. The electronic device of claim 20, wherein displaying the selected content in the partial display area comprises displaying the video in the partial display area.

* * * * *